United States Patent [19]

Keegan

[11] Patent Number: 4,805,195
[45] Date of Patent: Feb. 14, 1989

[54] SELECTABLE TIMING DELAY CIRCUIT

[75] Inventor: Timothy J. Keegan, San Jose, Calif.

[73] Assignee: Amdahl Corporation, Sunnyvale, Calif.

[21] Appl. No.: 939,277

[22] Filed: Dec. 10, 1986

Related U.S. Application Data

[63] Continuation of Ser. No. 618,881, Jun. 8, 1984, abandoned.

[51] Int. Cl.[4] .......................... H04L 7/02; H04J 3/06
[52] U.S. Cl. .................................. 375/106; 375/118; 370/108; 328/63
[58] Field of Search ....................... 375/107, 118, 106; 370/108; 307/269; 328/63, 55, 60; 455/51; 364/900

[56] References Cited

U.S. PATENT DOCUMENTS

| | | | |
|---|---|---|---|
| 2,779,933 | 1/1957 | Bradburd | 375/27 |
| 3,306,978 | 2/1967 | Simmons et al. | 370/100 |
| 4,165,490 | 8/1979 | Howe, Jr. et al. | 328/63 |
| 4,573,173 | 2/1986 | Yoshida | 370/108 |

Primary Examiner—Robert L. Griffin
Assistant Examiner—Marianne Huseman
Attorney, Agent, or Firm—Fliesler, Dubb, Meyer & Lovejoy

[57] ABSTRACT

Disclosed is a programmable timing delay circuit for use in a synchronous system which includes a number of remote modules which must receive a synchronized clock in order to operate properly. The programmable timing delay circuit includes a plurality of delay paths which receive the reference clock signal and provide a variety of delays to a selector. The selector is controlled by an input means which allows selection of the optimum delay paths for a particular module. In this manner the clock signal received at each of the remote modules can be tuned to the desired synchronous phase.

2 Claims, 2 Drawing Sheets

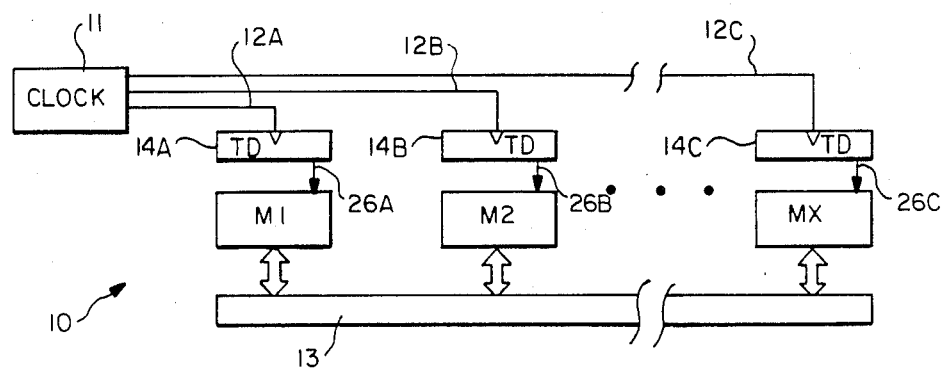
FIG.—1
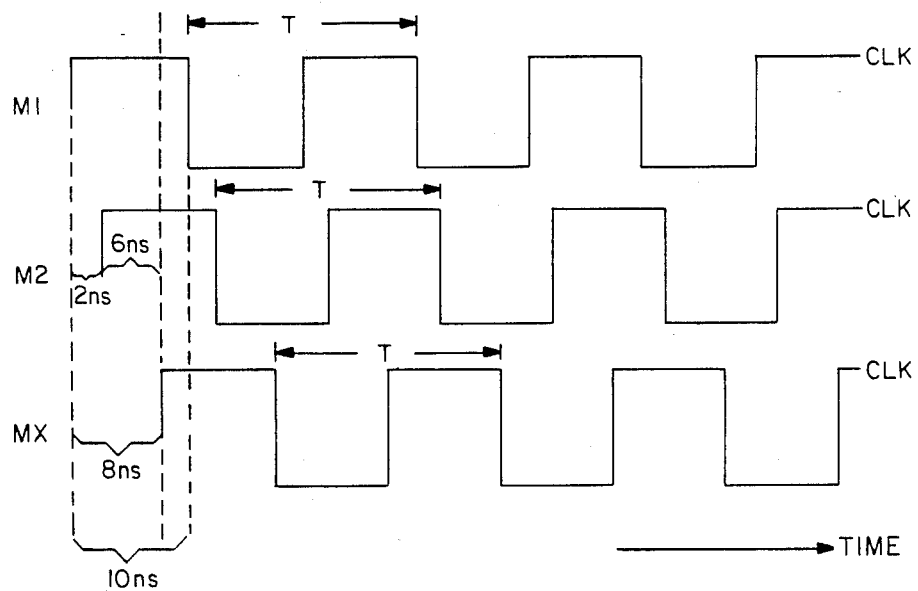
FIG.—2

SELECTABLE TIMING DELAY CIRCUIT

CROSS-REFERENCE TO RELATED APPLICATIONS

This application is a continuation of application, Ser. No. 06/618,881 filed June 8, 1984, now abandoned.

FIELD OF THE INVENTION

The present invention relates to selectable or programmable timing delay circuits for providing a synchronous clock signal to a number of remote modules in a synchronous system.

BACKGROUND OF THE INVENTION

In a synchronous system, such as a "mainframe" large scale computer, a clock signal is provided to all parts of the system which is synchronized, or delivered in phase, within a minimum margin of error. The propagation of the clock signal to the various parts of the system will cause the phase of clock due to propagation delays in the communication links among the various parts of the system to skew. When the parts of the system are located on modules which are remote from the clock which generates the clock signal, the propagation delays can be significant, leading to an uncceptable skew in the clock signal at the various modules and system malfunction. Thus, the propagation delays in the communication links which transmit the clock signal must be equalized in order to provide the synchronized clock necessary for running the system.

Typically, the synchronization of the clock by adjusting the delays associated with each of the communication links involves a cumbersome and slow process. Before startup of the machine, with the power on, an operator would measure the clock skew at each of the modules in the system using an oscilloscope or other sensitive measuring equipment. Based on the readings the operator obtains, the operator would then add or subtract a delay element, typically loops of wire or other delay taps, manually to the communication link. The step would involved cutting and soldering the communication link or other equally cumbersome technique which must be accomplished when the system is turned off.

As systems such as mainframe computers grow faster and faster, the synchronization of the clock signal is more and more important. Thus there is a need for an apparatus which provides the delay necessary to synchronize the clock on the communication links which provides ease of adjustment of the clock skew, without powering down the system and without requiring manual soldering or similar cumbersome techniques.

SUMMARY OF THE INVENTION

In accordance with the foregoing, the present invention provides a selectable or programmable timing delay circuit which allows the clock signal to be synchronized at remote modules in a given system easily, without powering down the system, and without requiring manual soldering or other cumbersome techniques during the setting up of the machine. Thus, in a system with a plurality of modules, an apparatus for communicating a synchronous clock signal to the plurality of modules comprises a clock means which generates a reference clock signal. A communication link is provided for each of the plurality of modules, which receives the clock signal, and delivers synchronous clock signal to each of the modules. A timing delay means on at least one of the communication links includes a plurality of selectable delay path means which receive and delay the reference clock signal by various delay times. A selector means selects, in response to a select signal, at least one of the delay path means to provide the delay time in the reference clock which provides the synchronous clock signal. A means for generating the select signal is also provided.

The means for generating the select signal in one embodiment includes a computer means which conducts a thresholds of failure algorithm to calculate the optimum delay for a given communication link. Other means for providing a select signal are also disclosed, such as providing a DIP switch for generating the select signal on the timing delay circuit.

BRIEF DESCRIPTION OF THE DRAWINGS

FIG. 1 is a block diagram of a synchronous system including a plurality of modules according to the present invention.

FIG. 2 is a timing diagram used in illustration of the present invention.

DETAILED DESCRIPTION OF THE PREFERRED EMBODIMENT

Figure 3:
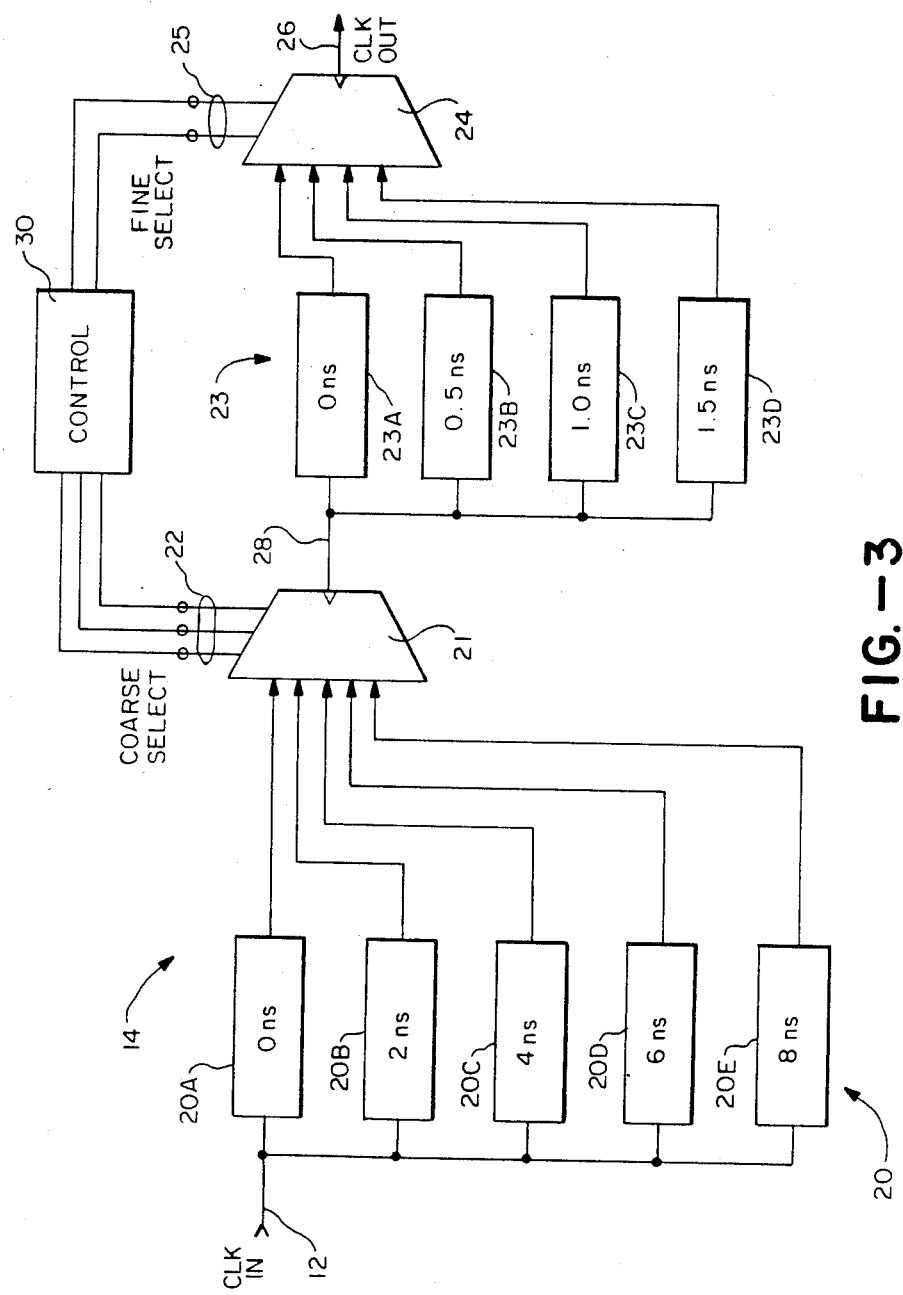
FIG. 3 is a block diagram of a preferred embodiment of the timing delay apparatus of the present invention.

With reference to the Figures, a detailed description of the preferred embodiment is provided.

FIG. 1 is a block diagram of a system 10 employing the present invention. The system 10 includes a clock 11 which is communicated across communication links 12A, 12B and 12C to remote modules M1, M2 and MX respectively. As indicated in the Figure, there may be any number of remote modules in a system 10 according to the present invention. The system 10 may be for instance a "mainframe" computer in which the remote modules M1, M2, . . . MX communicate among each other across the bus 13. The mainframe computer, in order to operate properly, must have a synchronized clock signal provided at each of the remote modules M1, M2, . . . MX. Thus in the present invention a timing delay apparatus 14A, 14B, and 14C receives the clock signal across the communication links 12A, 12B and 12C respectively, and provides a synchronous clock output across lines 26A, 26B, 26C to the remote modules M1, M2, . . . MX.

In FIG. 2, a timing diagram showing a clock signal with a 20 nanosecond period T as it arrives in the remote modules M1, M2 and MX is provided. The timing delay circuits 14A, 14B and 14C receive clock signals in the forms shown and cause delays which result in synchronization of the clock by adjusting the phase of the clock signal at each module to coincide with the phase of the clock signal at the module MX having the longest propagation delay. In the example shown in FIG. 2, the timing delay circuit 14A on the module M1 provides a delay of 8 nanoseconds so that the clock is synchronized at module M1 with the clock as it arrives at the module MX, which has the longest propagation delay in the system. The timing delay circuit 14B on module M2 after a 2 nanosecond propagation delay would provide a delay of 6 nanoseconds in our example so that it would coincide in phase with the clock signal with the module MX. The timing delay circuit 14C on the module MX would provide for no delay in the clock signal as it is delivered to the module MX from the communication link 12C.

The illustration in FIG. 2 is meant as an example only. For other clock cycle times and other arrangements of the modules, the delays will be different. Also it may occur that a propagation delay across a given communication link is longer than a half cycle of the clock. In this case the clock signal at a given module, in order to provide a synchronized clock, may be delayed so that it is exactly 360 degrees out of phase with the clock at others of the modules. In this situation, of course, the modules would be designed to compensate for this clock signal being out of phase by 1 cycle time. Other schemes for providing a synchronized clock using the delay circuit of the present invention can be used as is known in the art.

FIG. 3 shows a more detailed diagram of the preferred timing delay circuit 14. The clock signal is received by the timing delay circuit 14 across the communication link 12. A plurality of delay path means 20A, 20B, 20C, 20D, 20E each receive the clock signal in parallel. Each of the delay paths provides a various delay for the clock signal. For instance, as shown in the Figure, delay path 20A provides a 0 nanosecond delay, delay path 20B provides a two nanosecond delay, delay path 20C provides a four nanosecond delay, delay path 20D provides a six nanosecond delay, and delay path 20E provides an eight nanosecond delay. The outputs of each of the plurality of the delay paths 20 is provided to a selector means 21. The selector means 21 receives a coarse select input 22 comprised of a 3 bit select signal for causing the selector means 21 to select a particular one of the plurality of delay path means 20.

The output 28 from the selector means 21 will provide a delayed clock signal which is delayed by a selected delay. In the preferred embodiment, the output 28 from the selector means 21 is provided in parallel to a second plurality of delay path means 23. The second plurality of delay path means 23 is made up in FIG. 3 of delay path 23A which provides a 0 nanosecond delay, delay path 23B which provides a 0.5 nanosecond delay, delay path 23C which provides a 1.0 nanosecond delay, and delay path 23D which provides a 1.5 nanosecond delay. The outputs from the second plurality of delay paths 23 are provided at the input of a second selector means 24. A fine select input 25 which is made up of a 2 bit fine select signal is provided at the second selector means 24 for selecting a particular one of the second plurality of delay path means 23. The output 26 of the second selector means 24 provides a synchronized clock signal. As can be seen with reference back to FIG. 1, the synchronized clock output signal on line 26 is provided to the particular module MN, where N is any of the digits, 1 through X.

A control means 30 for generating the coarse select and fine select inputs 22, 25 for controlling the selector means 21, 24 respectively to select the proper delay to provide a synchronized clock signal may take a variety of forms as suit the user. For instance the control means 30 can be made up of a DIP switch or other manual switch which provides the input to the selector means 21, 24. An operator can measure the difference in phase of the clock signal as it arrives at a particular module and compare it to the desired phase of the clock signal. Then the operator may operate the DIP switch of the control means 30 to cause a proper delay to be selected through the timing delay circuit 14. This can be accomplished without turning off the synchronous system 10, without requiring any soldering of wires or other cumbersome techniques to accomplished the task.

Another alternative for the control means 30 is to provide a PROM or other storage means which stores the select signals for a set configuration of the modules. The PROM could be located on the clock or on each of the modules as suits the user.

In the preferred embodiment the system 10 is a mainframe large-scale computer which performs a thresholds of failure algorithm to tune the clock signal. In this type of system, the select inputs 22 and 25 are provided by a control means 30 which includes a detector means (not shown) which detects and stores a minimum delay for each of the timing delay circuits 14 in the system 10, which will allow the system 10 to operate within its tolerance of clock skew. Also the detector means will detect and store a maximum delay operable for each of the timing delay circuits 14 in the system 10. The computer system 10, or an additional computer means comprised of a logic circuit for running this thresholds of failure algorithm, will calculate, from the maximum and minimum delays detected by the detector means, an optimum delay for each of the timing delay circuits 14 at each of the modules. Typically the optimum delay will be halfway between the maximum and minimum delays.

By determining and providing the optimum delay for each of the modules, the clock signal is provided to each of the modules in a manner which will increase the reliability of the system 10. This is accomplished because the problems with clock skew and the range of acceptable clock skew within each of the modules will be more tightly controlled. Further, the importance of the optimum timing delay for each of the modules is enhanced as the clock rate of computer systems increases.

The first plurality of delay paths 20 and second plurality of delay paths 23 may be made up of a variety of parts, for instance, a loop of wire might be provided for each of the delay paths. The loop of wire required would be for example about 10 inches long for a 1 nanosecond delay. For longer delays, a series of gates can be included in a given delay path.

The various delay path means can be manufactured with the system with great accuracy and included into the timing delay apparatus 14 of the present invention. In this manner the control of the timing delay for each of the modules is very precise. In the examples shown in FIG. 3, a timing delay of up to 9.5 nanoseconds in 0.5 nanosecond steps is possible. For a 10 nanosecond cycle time, this will provide a 5% accuracy in the synchronization of the circuit. By providing smaller increments of timing delays, a more accurate circuit can be devised.

The clock 11 in FIG. 1 is illustrated as being separate from the series of remote modules M1, M2 . . . MX. It should be appreciated that the clock 11 could be included within any of the modules if desired.

Also the preferred timing delay circuit 14 illustrated in FIG. 3 shows a coarse select, fine select scheme which allows for selection of up to nineteen different delays through a given circuit with nine delay paths 20, 23. The circuit 14 could be designed including any number of selectors in any combination of delay paths.

While the invention has been particularly shown and described with reference to preferred embodiments thereof it will be understood by those skilled in the art that various changes in form and details may be made therein without departing from the spirit and the scope of the invention.

What is claimed is:

1. In a system with a plurality of modules, an apparatus for communicating a synchronous clock signal to the plurality of modules, comprising:
   (a) clock means for generating a reference clock signal,
   (b) a communication link for each said plurality of modules for communicating the reference clock signal to the plurality of modules; and
   (c) timing delay means on at least one of said communication links including:
      (i) a first plurality of selectable coarse delay path means for receiving the reference clock signal in parallel and independently providing respective clock signals each having a different predetermined delay value with respect to said reference clock signal, each of said coarse delay path means causing an amount of delay that differs from amounts of delay caused by the others of said delay path means by at least a coarse increment of delay;
      (ii) a first select means, responsive to a coarse select signal, for selecting one of said first plurality of coarse delay path means to provide a delayed clock signal,
      (iii) a second plurality of selectable fine delay path means for receiving the delayed clock signal in parallel and delaying the delayed clock signal by various fine delays where said fine delays are of shorter duration that said coarse delays increment of delay,
      (iv) a second selector means, responsive to a fine select signal separate from the coarse select signal, for selecting one of said second plurality of fine delay path means to provide a synchronous clock signal, and
      (v) a control means for generating the coarse and fine select signals, the coarse and fine select signals being generated based upon a predetermined algorithm to optimize reliability of the system.

2. In a system with a plurality of modules, an apparatus for communicating a synchronous clock signal to the plurality of modules, comprising:
   clock means for generating a reference clock signal;
   a communication link for each of said plurality of modules for communicating a reference clock signal to the plurality of modules; and
   clock adjustment means on at least one of said communication links including a coarse delay means and a fine delay means
   the coarse delay means for supplying a coarse delayed clock signal, including a plurality of separate coarse delay paths receiving the reference clock signal in parallel and independently providing coarse delayed outputs in parallel, a first of the separate coarse delay paths causing essentially zero delay, a second of the separate coarse delay paths causing essentially a coarse increment of delay and each other of the separate coarse delay paths causing essentially a multiple of the coarse increment of delay, and
   a first selector means, responsive to a coarse select signal and connected to receive each of the coarse delayed outputs from the separate coarse delay paths in parallel, for selecting one of the coarse delayed outputs to provide the delayed clock signal, and
   the fine delay means for supplying the synchronous clock signal, including a plurality of separate fine delay paths receiving the delayed clock signal in parallel and supplying fine delayed outputs in parallel, a first of the separate fine delay paths causing essentially zero delay, a second of the separate fine delay paths causing essentially a fine increment of delay and each other of the separate fine delay paths causing essentially a multiple of the fine increment of delay, the maximum multiple of the fine increment of delay being provided by one of the separate fine delay paths being less than the coarse increment of delay, and
   a second selector means, responsive to a fine select signal separate from the coarse select signal and connected to receive each of the fine delayed outputs from the separate fine delay paths in parallel, for selecting one of the fine delayed outputs as the synchronous clock signal, and
   a control means for generating the coarse and fine select signals, the coarse and fine select signals being generated based upon a predetermined algorithm to optimize reliability of the system.

* * * * *